United States Patent
Deml et al.

(10) Patent No.: US 8,540,316 B2
(45) Date of Patent: Sep. 24, 2013

(54) SCISSORS-TYPE FRAME FOR A VEHICLE SEAT AND METHOD FOR PRODUCING A SUBSTRUCTURE OF A VEHICLE SEAT

(75) Inventors: Johann Deml, Thanstein (DE); Erich Dieling, Hohenburg (DE); Josef Kohl, Hirschau (DE); Alexander Lorey, Maxhuette-Haidhof (DE); Manfred Renner, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 804 days.

(21) Appl. No.: 12/614,241

(22) Filed: Nov. 6, 2009

(65) Prior Publication Data
US 2010/0117428 A1 May 13, 2010

(30) Foreign Application Priority Data
Nov. 6, 2008 (DE) .......................... 10 2008 056 200

(51) Int. Cl.
*B60N 2/16* (2006.01)
*F16M 13/00* (2006.01)

(52) U.S. Cl.
USPC .................. 297/344.15; 297/344.16; 248/421

(58) Field of Classification Search
USPC .......... 297/344.12, 344.15–344.17; 248/421, 248/564, 588, 157, 188.2
See application file for complete search history.

(56) References Cited

U.S. PATENT DOCUMENTS

| | | |
|---|---|---|
| 2,973,968 A | 3/1961 | Behles |
| 3,042,392 A | 7/1962 | Schmitz et al. |
| 3,466,055 A | 9/1969 | Keijzer |
| 3,552,763 A | 1/1971 | Yasin |
| 3,762,769 A | 10/1973 | Poschl |
| 3,865,340 A * | 2/1975 | Ellis .............................. 248/562 |
| 3,938,770 A | 2/1976 | Turner et al. |
| 3,966,223 A | 6/1976 | Carr |
| 4,052,088 A | 10/1977 | Nicholls |
| 4,159,105 A | 6/1979 | Vander Laan et al. |
| 4,193,629 A | 3/1980 | Merkle |
| 4,286,765 A | 9/1981 | Delgleize et al. |
| 4,418,955 A | 12/1983 | Muncke et al. |
| 4,451,079 A | 5/1984 | Takahashi |
| 4,463,839 A | 8/1984 | Ashiba |
| 4,469,010 A | 9/1984 | Skover, Jr. et al. |
| 4,600,215 A | 7/1986 | Kuroki et al. |
| 4,634,142 A | 1/1987 | Woods et al. |
| 4,645,042 A | 2/1987 | Inoue et al. |
| 4,645,169 A | 2/1987 | Mischer |
| 4,684,100 A | 8/1987 | Grassl |

(Continued)

FOREIGN PATENT DOCUMENTS

| | | |
|---|---|---|
| DE | 452315 | 11/1927 |
| DE | 2604809 | 8/1977 |

(Continued)

*Primary Examiner* — David Dunn
*Assistant Examiner* — Tania Abraham
(74) *Attorney, Agent, or Firm* — Lowe Graham Jones, PLLC (57) ABSTRACT

To be able to produce a scissors-type frame of a vehicle seat in a quick and easy manner, the present invention is directed to a scissors-type frame for a vehicle seat, in particular for a motor vehicle seat, comprising a first scissors element and a second scissors element, wherein the scissors-type frame is height-adjustable by means of the two scissors elements, and wherein the scissors-type frame is characterized in that one of the two scissors elements passes through the other of the two scissors elements.

30 Claims, 8 Drawing Sheets

(56) References Cited

U.S. PATENT DOCUMENTS

| | | |
|---|---|---|
| 4,700,921 A * | 10/1987 | Holbrook .................. 248/421 |
| 4,700,971 A | 10/1987 | Doi et al. |
| 4,726,604 A | 2/1988 | Asami et al. |
| 4,729,539 A * | 3/1988 | Nagata .................. 248/575 |
| 4,729,580 A | 3/1988 | Buma et al. |
| 4,733,847 A | 3/1988 | Grassl |
| 4,822,094 A | 4/1989 | Oldfather et al. |
| 4,852,863 A | 8/1989 | Breitenbacher et al. |
| 4,941,641 A | 7/1990 | Granzow et al. |
| 4,946,145 A | 8/1990 | Kurabe |
| 5,058,852 A | 10/1991 | Meier et al. |
| 5,125,631 A * | 6/1992 | Brodersen et al. .......... 267/131 |
| 5,133,575 A | 7/1992 | Zantinge et al. |
| 5,169,112 A * | 12/1992 | Boyles et al. .............. 248/550 |
| 5,169,129 A | 12/1992 | Hoffman |
| 5,176,355 A | 1/1993 | Carter |
| 5,217,210 A | 6/1993 | Schützner |
| 5,234,203 A | 8/1993 | Smith |
| 5,255,935 A | 10/1993 | Imani |
| 5,324,069 A | 6/1994 | Ogawa |
| 5,364,060 A * | 11/1994 | Donovan et al. ............ 248/588 |
| 5,413,316 A | 5/1995 | Easter |
| 5,425,436 A | 6/1995 | Teramura et al. |
| 5,428,533 A | 6/1995 | Ogawa |
| 5,450,322 A | 9/1995 | Tanaka et al. |
| 5,533,703 A | 7/1996 | Grassl et al. |
| 5,536,059 A | 7/1996 | Amirouche |
| 5,555,501 A | 9/1996 | Furihata et al. |
| 5,558,398 A | 9/1996 | Santos |
| 5,564,520 A | 10/1996 | Forsythe |
| 5,603,387 A | 2/1997 | Beard et al. |
| 5,623,410 A | 4/1997 | Furihata et al. |
| 5,735,509 A | 4/1998 | Gryp et al. |
| 5,941,920 A | 8/1999 | Schubert |
| 6,000,703 A | 12/1999 | Schubert et al. |
| 6,029,764 A | 2/2000 | Schubert |
| 6,067,491 A | 5/2000 | Takahashi |
| 6,078,791 A | 6/2000 | Tuttle et al. |
| 6,082,715 A | 7/2000 | Vandermolen |
| 6,314,353 B1 | 11/2001 | Ohsaku et al. |
| 6,371,456 B1 | 4/2002 | Ritchie et al. |
| 6,490,930 B1 | 12/2002 | Ohkubo et al. |
| 6,616,116 B1 | 9/2003 | Rochau et al. |
| 7,152,839 B2 | 12/2006 | Mullinix et al. |
| 7,185,867 B2 * | 3/2007 | Hill et al. .................. 248/421 |
| 7,712,836 B2 | 5/2010 | Deml |
| 2001/0044685 A1 | 11/2001 | Schubert |
| 2003/0015830 A1 | 1/2003 | Miller et al. |
| 2003/0140487 A1 | 7/2003 | Plettner |
| 2004/0094912 A1 | 5/2004 | Niwa et al. |
| 2006/0185434 A1 | 8/2006 | Bernhagen |
| 2007/0236071 A1 | 10/2007 | Fujita et al. |
| 2008/0156602 A1 | 7/2008 | Hiemenz et al. |
| 2008/0197684 A1 | 8/2008 | Ott et al. |
| 2009/0026816 A1 | 1/2009 | Haller |
| 2009/0134595 A1 | 5/2009 | Haller et al. |
| 2009/0272871 A1 | 11/2009 | Haller |
| 2010/0102493 A1 | 4/2010 | Deml et al. |
| 2010/0117428 A1 | 5/2010 | Deml et al. |
| 2010/0181708 A1 | 7/2010 | Kolb et al. |

FOREIGN PATENT DOCUMENTS

| | | |
|---|---|---|
| DE | 8104855 | 8/1981 |
| DE | 220674 | 4/1985 |
| DE | 223835 | 6/1985 |
| DE | 3517503 | 11/1986 |
| DE | 4211095 | 10/1993 |
| DE | 4211628 | 10/1993 |
| DE | 4335199 | 5/1995 |
| DE | 19803750 | 8/1998 |
| DE | 19714576 | 10/1998 |
| DE | 19902224 | 4/2000 |
| DE | 19848821 | 5/2000 |
| DE | 20214583 | 1/2003 |
| DE | 10317134 | 6/2004 |
| DE | 10330198 | 2/2005 |
| DE | 102004054325 | 4/2006 |
| DE | 102006017774 | 4/2006 |
| DE | 102005023090 | 11/2006 |
| DE | 102005043575 | 3/2007 |
| DE | 102005044214 | 3/2007 |
| DE | 102008018509 | 10/2009 |
| EP | 0089794 | 9/1983 |
| EP | 0563948 | 4/1993 |
| EP | 0938999 | 9/1999 |
| EP | 1050749 | 11/2000 |
| EP | 1188608 | 3/2002 |
| EP | 1352595 | 10/2003 |
| EP | 1464866 | 10/2004 |
| EP | 1484205 | 12/2004 |
| EP | 1657471 | 5/2006 |
| EP | 1693655 | 8/2006 |
| EP | 1844979 | 10/2007 |
| FR | 2879740 | 6/2006 |
| JP | 61075008 | 4/1986 |
| JP | 2133215 | 5/1990 |
| JP | 2197470 | 8/1990 |
| JP | 3200485 | 9/1991 |
| JP | 2004058695 | 2/2004 |
| JP | 2004185476 | 7/2004 |
| KR | 20020090377 | 12/2002 |
| WO | 8703256 | 6/1987 |
| WO | 8809270 | 12/1988 |
| WO | 8912766 | 12/1989 |
| WO | 0035708 | 6/2000 |
| WO | 0043952 | 7/2000 |
| WO | 0058125 | 10/2000 |
| WO | 02068229 | 9/2002 |
| WO | 2004057528 | 7/2004 |
| WO | 2004110808 | 12/2004 |
| WO | 2005008578 | 1/2005 |
| WO | 2005022690 | 3/2005 |
| WO | 2005095153 | 10/2005 |
| WO | 2005102112 | 11/2005 |

\* cited by examiner

SCISSORS-TYPE FRAME FOR A VEHICLE SEAT AND METHOD FOR PRODUCING A SUBSTRUCTURE OF A VEHICLE SEAT

PRIORITY CLAIM

This application claims the benefit of German Application Serial No. 10 2008 056 200.9 filed Nov. 6, 2008, contents of which are incorporated herein.

FIELD OF THE INVENTION

The invention relates to motor vehicle seats and, more specifically, to a scissors-type frame for a vehicle seat and to a method for producing a substructure of a vehicle seat.

BACKGROUND OF THE INVENTION

Generic scissors-type frames are known from the prior art and have been widely used in particular in the field of motor vehicles. In this field, they serve not only for adjusting the height of a seat in a motor vehicle, but also as a means of suspension for in particular increasing the seating comfort for a vehicle driver and ensuring a good seating comfort for example when the vehicle is moving over uneven ground.

Height-adjustable vehicle seats are often also provided with an air spring, wherein such an air spring can be influenced in terms of its spring effect by means of additional volumes which are usually arranged outside the air spring. By way of example, a required additional air volume can be pumped into a first abutment region of the air spring in order thereby to increase a degree of damping of the spring accordingly and to prevent the air spring from reaching its abutment. In addition or as an alternative, an additional air volume can be removed from an opposite abutment region and can be conveyed if necessary into an additional volume tank. This results in a large number of adjustment possibilities. In the case of such air springs for vehicle seats, therefore, often at least one external additional volume tank is required, which must be connected to the air spring as a separate unit by means of further air connections. Such additional volume tanks must be arranged as additional elements within the vehicle seat and thus take up additional space.

However, due to the desired compression of their parts in order to reduce their space requirement within the vehicle, such height-adjustable vehicle seats are often being designed with an increasingly small base frame, resulting in the problem of the presence of a sufficient amount of space for such an additional volume tank.

It should furthermore be emphasized that previously known scissors-type frames for vehicle seats with relatively large suspensions and relatively large spring travels provided exclusively multiple-component rockers with welded-in axles or tubes for bearing purposes, as a result of which in particular the risk of manufacturing tolerances usually increases.

By way of example, the document DE 10 2006 017 774 A1 discloses a vehicle seat with a height-adjustable seat frame, which comprises at least two seat frame parts that can move relative to one another and at least one gas spring which is arranged between the seat frame parts for the purpose of height adjustment, wherein at least one control device for influencing the gas spring is provided. The control device comprises at least one valve device which is attached to a first seat frame part and which comprises control valves for actuating gas flows for the gas spring, and also a control slide which is provided on a second seat frame part and which is intended for actuating the control valves, so that a pre-settable height of the vehicle seat is ensured regardless of a weight loading of the vehicle seat. This is a vehicle seat in which the control slide can be adjusted relative to the second seat frame part by means of an adjustment device regardless of a relative position of the seat frame parts, so that a movement of the control slide relative to the second seat frame part which is brought about by the adjustment device brings about a height adjustment of the vehicle seat. Therefore, although a height adjustment of the vehicle seat can be achieved in a simple manner, nevertheless the production of such a seat requires a relatively complicated construction comprising numerous components.

From the further document DE 43 35 199 C1 it is known to provide a sprung vehicle seat with a scissors-type frame which comprises scissors elements that can pivot about a common scissors axle. For adjusting the scissors-type frame, a gas spring is provided, to which there can be connected a first valve device for adjusting the height of the vehicle seat and, via a coupling, a second valve device for setting the height of the driver's seat in a weight-dependent manner. The coupling comprises a segment element with an arc-shaped toothed section, which is pivotable about the scissors axis, and a pivoting arm with a toothing which can be brought into meshing engagement with the toothed section. The pivoting arm is connected to one of the scissors elements and can be actuated by means of a drive device which is connected to the first valve device. Also arranged pivotably on the scissors axle is a slide element which serves for actuating the second valve device and which is movable to a limited extent relative to the segment element. This construction is also very complicated.

A simplified substructure for a vehicle seat with a scissors-type frame comprising two pivotable frame elements is described in European patent EP 0 563 948 B1. Here, the two pivotable frame elements of the scissors-type frame are not fixedly connected to one another but rather merely bear against one another. There is therefore no need for welded-in axles or tubes for bearing the two frame elements relative to one another. As a result, the scissors-type frame can be of relatively simple design, but the frame elements do not form a coherent unit, which means that in particular the assembly of the scissors-type frame can take place only in conjunction with a base element and a seat plate. Moreover, no space is provided for an air or gas pressure damper.

SUMMARY OF THE INVENTION

The present invention is directed to a scissors-type frame for a vehicle seat, in particular a motor vehicle seat, comprising a first scissors element and a further scissors element, wherein the scissors-type frame is height-adjustable by means of the two scissors elements. In addition, the invention is directed to a vehicle seat with a substructure. Moreover, the invention is directed to a method for producing a substructure of a vehicle seat in which a first scissors element is rotatably connected to a further scissors element of a scissors-type frame of the substructure.

The invention provides a generic scissors-type frame consisting at least of two scissors elements as a compact and coherent structural unit, which can moreover be produced quickly and easily. This is preferably achieved by a scissors-type frame for a vehicle seat comprising a first scissors element and a further scissors element, wherein the scissors-type frame is height-adjustable by means of the two scissors elements, and wherein the scissors-type frame is characterized in that one of the two scissors elements passes through the other of the two scissors elements. Since a first scissors element passes through a further scissors element, the scissors-type frame can overall be of very compact and simple construction.

In particular, the present scissors-type frame differs from the scissors-type frames of the documents DE 10 2006 017 774 A1 and DE 43 35 199 C1 by the fact that in the present case only two centrally arranged scissors elements are used. In this case there is advantageously no need to use laterally arranged scissors elements, as a result of which in particular the number of scissors elements can be reduced.

The scissors-type frame according to the invention differs from the scissors-type frame disclosed in the European patent EP 0 563 948 B1 in particular by the fact that in the present case the first scissors element passes through the second scissors element. In the scissors-type frame from the European patent EP 0 563 948 B1, one of the frame elements is moved towards the other of the frame elements from outside and then is merely leaned against the other frame element, without passing through the latter. Instead, one frame element is tangent to the other frame element.

In the context of the present invention, the term "scissors-type frame" describes a shape preferably of a substructure of a vehicle seat, which comprises two scissors elements that are rotatably connected to one another. The two scissors elements are in this case connected to one another in such a way that they form a coherent, non-detachable unit. In this respect, too, the scissors-type frame according to the invention differs from the scissors-type frame of the aforementioned European patent, since therein the scissors-type frames merely lean against one another. In this case, the scissors-type frame with its two scissors elements can already on its own substantially form the substructure of the vehicle seat.

One variant embodiment provides that one of the two scissors elements is arranged within a peripherally closed material cutout of the other of the two scissors elements. Advantageously, the other scissors element of the scissors-type frame comprises such a peripherally closed material cutout, so that the first scissors element can be pushed through the other scissors element without any problem and in a space-saving manner. In this case, edge regions of the peripherally closed material cutout can also be used as a type of stop if they are appropriately shaped. As a result, the operational safety of the scissors-type frame and thus also of a vehicle seat can be increased.

If one of the two scissors elements encompasses the other of the two scissors elements, a scissors-type frame can be provided as a particularly compact unit.

In addition, it is advantageous if the two scissors elements are mounted such that they can rotate about a common bearing axle, preferably about a common push-in axle. If the scissors-type frame has a common bearing axle for the two scissors elements, the scissors-type frame can advantageously be formed in one piece. As a result, the handling of the scissors-type frame, for instance during installation of a vehicle seat, can be substantially simplified. In particular, a push-in axle can easily be introduced from the side into suitable push-in axle openings of the scissors elements.

The invention is also directed to a method for producing a substructure of a vehicle seat, in particular of a motor vehicle seat, in which a first scissors element is rotatably connected to a further scissors element of a scissors-type frame of the substructure, and in which one of the scissors elements is pushed through the other of the scissors elements and then the two scissors elements are non-detachably connected to one another.

By means of such a production method, assembly of a scissors-type frame for a vehicle seat can be carried out in a particularly simple manner. Moreover, the scissors elements can be non-detachably but rotatably connected to one another in a particularly simple manner by means of a push-in axle.

In the present context, the term "non-detachably" describes the fact that the two scissors elements cannot be lifted off one another.

If at least one of the two scissors elements, preferably both scissors elements, is made by forming from a semi-finished product, the scissors-type frame can ideally be produced without welding. Problems in respect of component warping due to a critical introduction of heat into the construction can thus be avoided, as a result of which a particularly high manufacturing precision on the scissors elements can also be achieved.

As the semi-finished product, use may be made in the present case of a metal sheet suitable for deep-drawing and/or punching or the like. The term "forming" describes in this context any processes by means of which the shape of the semi-finished product can be changed. By means of such formed components, a particularly homogeneous structure and thus also an extremely good load-bearing capacity of a component can be achieved. As a result, components such as the scissors elements for example can be formed with less bulk than conventional frame elements while being able to withstand the same loads.

One advantageous variant embodiment moreover provides that at least one of the two scissors elements, preferably both scissors elements, is produced as a one-piece punched sheet metal element and/or as an element made by bending. The scissors elements can in the present case thus be formed in each case in one piece as rocker-like scissors arms. Straightening work, as is often necessary on a welded construction, can thus advantageously be avoided. In addition, punched sheet metal elements and/or elements made by bending can be characterized by a very high strength of the component.

One method variant therefore provides that in particular the scissors elements are formed from metal sheets and are provided in a manner free from weld seams. It is thus possible to avoid any critical introduction of heat into the metal sheets.

Another variant embodiment that must be highlighted in particular provides that one of the two scissors elements has a through-opening for a damper of the scissors-type frame, through which the damper can be and/or is arranged. If at least one scissors element of the scissors-type frame has such a through-opening for a damper, the damper can be integrated much better in the scissors-type frame. The scissors-type frame can thus be made even more compact.

In particular in this context it is advantageous if the scissors-type frame comprises a damper device with a damper, wherein the damper passes through a further scissors element arranged within a first scissors element. In this case, the damper device or the damper may be arranged at an angle or parallel to that scissors element which is passed through by the other scissors element of the scissors-type frame. A scissors-type frame of a vehicle seat which comprises a damper device can thus be made to fit inside a particularly small space.

In addition, the scissors-type frame may comprise an upper terminal element and a lower terminal element, on which on the one hand in each case one of the two scissors elements is mounted in a rotational manner by means of a rotary bearing and on which on the other hand in each case one of the two scissors elements is mounted in a translational manner by means of a sliding bearing, wherein a damper device of the scissors-type frame is mounted on one of the rotary bearings, preferably on the rotary bearing of the lower terminal element. If such terminal elements are additionally provided on the scissors-type frame, the scissors-type frame can be better integrated in a substructure of a vehicle seat. By way of example, the actual vehicle seat can be attached to the upper terminal element. By means of the lower terminal element, the scissors-type frame can advantageously be mounted on a floor panel of a motor vehicle. Particularly if the damper device is attached to an existing rotary bearing, the structure of the scissors-type frame can be further simplified and attachment elements that would otherwise be necessary are not required.

Such a damper device, particularly with regard to the special through-opening for a damper, can already positively influence the further development of a conventional scissors-type frame, so that the features in connection with the damper device are advantageous even without the other features of the invention.

With regard to the method, it is furthermore advantageous if a seat plate and/or a base plate of the scissors-type frame is formed from metal sheets and provided in a manner free from weld seams, wherein the seat plate and/or the base plate is connected to one another in an articulated manner by means of the scissors elements.

One particularly preferred variant embodiment provides that the scissors-type frame comprises bearing devices for bearing the scissors elements against and/or in a terminal element of the scissors-type frame, wherein the bearing devices in each case comprise a bearing eye and/or a bearing pin which is formed by one of the scissors elements. If in particular the bearing devices or regions thereof, such as for example the bearing eyes or bearing pins, are formed directly by the scissors elements themselves, the structure of the present scissors-type frame can be considerably simplified further. In particular, there is advantageously no need for additional components, such as welded-in axles and/or tubes, for bearing the scissors elements.

It is thus furthermore advantageous if the respective bearing eye and/or the respective bearing pin are formed in one piece with one of the scissors elements. Such a bearing eye or such a bearing pin is preferably formed by punching. There is also advantageously no need for screw connections in respect of the bearing devices.

In order that in particular the bearing pins can slide with little friction and thus particularly well in corresponding bearing grooves, it is advantageous if the respective bearing pin comprises a sliding element.

Production of the scissors-type frame can be further simplified if the sliding element is pushed onto the respective bearing pin. In this case, barbs may be formed on the bearing pin by punching, so that the sliding element can be securely attached to the bearing pin without further aids. There is thus also no need for roller tracks, adjustment rail fixings or other additional bearing components, as a result of which the construction of the present scissors-type frame can be further simplified and made more space-saving.

It will be understood that such a sliding element can be produced in various shapes and from a wide range of materials. The sliding element can be configured in a manner that lends itself to a particularly high number of variations if the sliding element is made from plastic. Furthermore, good sliding properties are generally inherent in a plastic.

If the respective bearing pin and/or a sliding element of the respective bearing pin are mounted in guide devices of the terminal elements, wherein the guide devices are material cutouts of an upper terminal element or of a lower terminal element of the scissors-type frame, a type of hinge can be formed particularly easily between the scissors elements and the terminal elements. Preferably, the material cutouts are punched out of the terminal elements.

By means of such a guide device in the form of a material cutout, a scissors element can be displaced in the longitudinal direction of a terminal element, without having to use additional hinge-like components.

Accordingly, it is advantageous if the scissors-type frame comprises an upper terminal element and a lower terminal element, wherein the upper and/or the lower terminal element comprises guide devices in which bearing pins of the scissors elements are mounted in a sliding manner. As a result, the individual scissors elements can be mounted on the terminal elements in a structurally simple manner and such that they can move linearly in particular.

Particularly in the context of the bearing devices, a further variant embodiment provides that the scissors-type frame comprises a connection device for connecting one of the scissors elements to one of the terminal elements, in which a first connection element is formed from the scissors element and a further connection element is formed from the terminal element. In one simple case, the first connection element of the connection device is a bearing pin of a scissors element, and the other connection element of the connection device is a guide device in the form of a material cutout of the terminal element. The connection device can thus advantageously be provided on the present scissors-type frame without the need for additional components.

The proposed connection device can also be of very simple design if the first connection element is guided in the other connection element.

Furthermore, one extremely advantageous variant embodiment provides that the scissors-type frame comprises a spring device with at least one spring element, wherein the spring element is arranged in an interacting manner between one of the scissors elements and one of the terminal elements. In addition to the abovementioned damper device, a spring device can also be integrated particularly well in the scissors-type frame if the spring element is arranged in an interacting manner between one of the scissors elements and one of the terminal elements.

The spring device can be mounted on and attached to a scissors element in a particularly wear-resistant manner if the spring device comprises a spring support which is arranged in a roll-off manner at one end of one of the scissors elements.

The spring support consists of a tubular segment which offers closure contact to the spring(s) and which can be rolled off or tilted over the edge that is subjected to loading. In most spring supports, rotational movements in the bearing cannot be ruled out, which leads to considerable loads and wear on the bearing points. This embodiment makes it possible not only to increase the contact area (linear contact instead of point contact), but rather at the same time makes it possible to minimize the friction through conversion into a roll-off/tilting movement about the edge.

The spring support can be guided on the scissors element in an operationally safe manner if the spring support comprises a notch, into which the scissors element protrudes with a tab.

It will be understood that one or more spring elements may correspond to the spring support almost at will. If the spring support comprises two spring end holders, into which spring ends of spring elements can be hooked, the spring elements can be securely mounted on and attached to the spring support.

By means of the above-described spring device and in particular the spring support thereof, it is possible in a particularly advantageous manner to integrate such a spring device in a space-saving manner in a scissors-type frame of a vehicle seat. Preferably, the spring device is located or the spring elements of the spring device are located substantially parallel to one of the terminal elements, as a result of which the spring device can be integrated in a particularly space-saving manner within the scissors-type frame. Since the features of such a spring device can on their own positively influence the further development of conventional scissors-type frames, the features in connection with the present spring device are advantageous even without the other features of the invention.

The present invention is also directed to a vehicle seat, in particular a motor vehicle seat, with a substructure, in which the substructure comprises a scissors-type frame according to one of the aforementioned features or according to one of the aforementioned combinations of features. On the whole, it is thus possible to provide a substructure comprising a scissors-type frame which can be produced with particularly high manufacturing precision, and advantageously essentially without additional components, apart from rotary and bearing axles and also sliding bearings.

Further advantages, aims and properties of the present invention will be explained with reference to the drawing appended to the following description, in which a motor vehicle seat substructure comprising a scissors-type frame is shown by way of example. Components which correspond at least substantially with regard to their function in the figures may be provided here with the same references, wherein these components need not be shown and explained in all figures.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
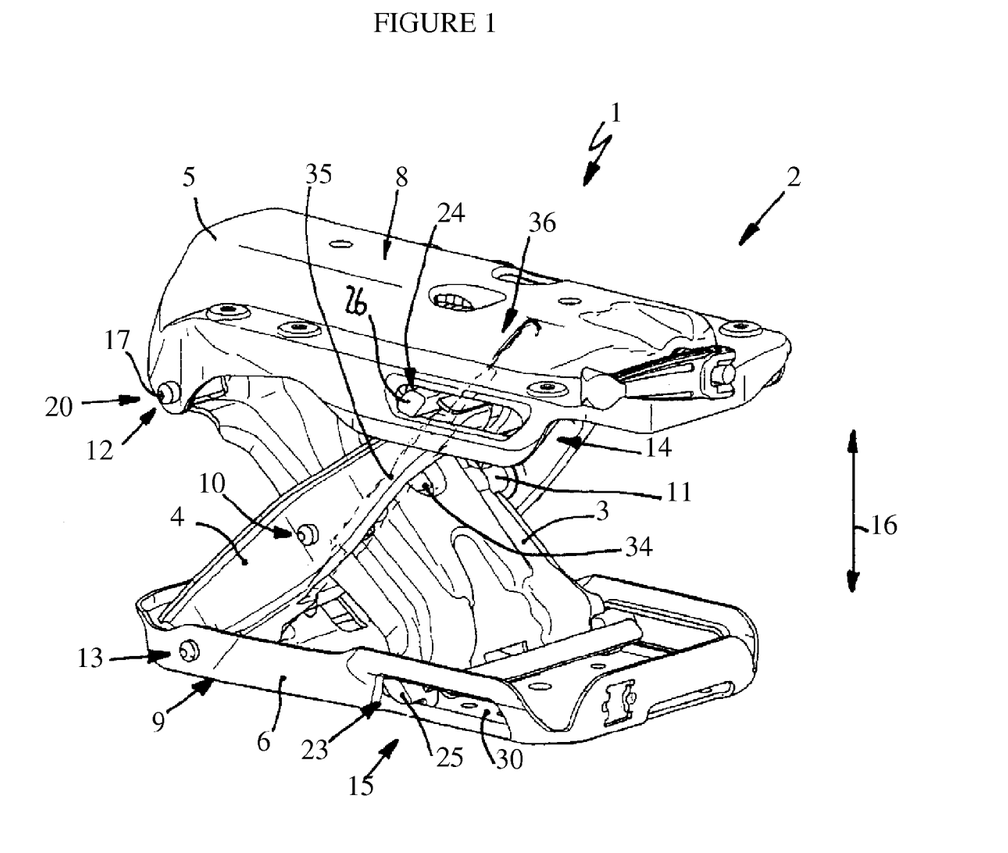
FIG. 1 schematically shows a perspective view of a scissors-type frame comprising two scissors elements which are inserted one inside the other and are mounted rotatably relative to one another.
Figure 2:
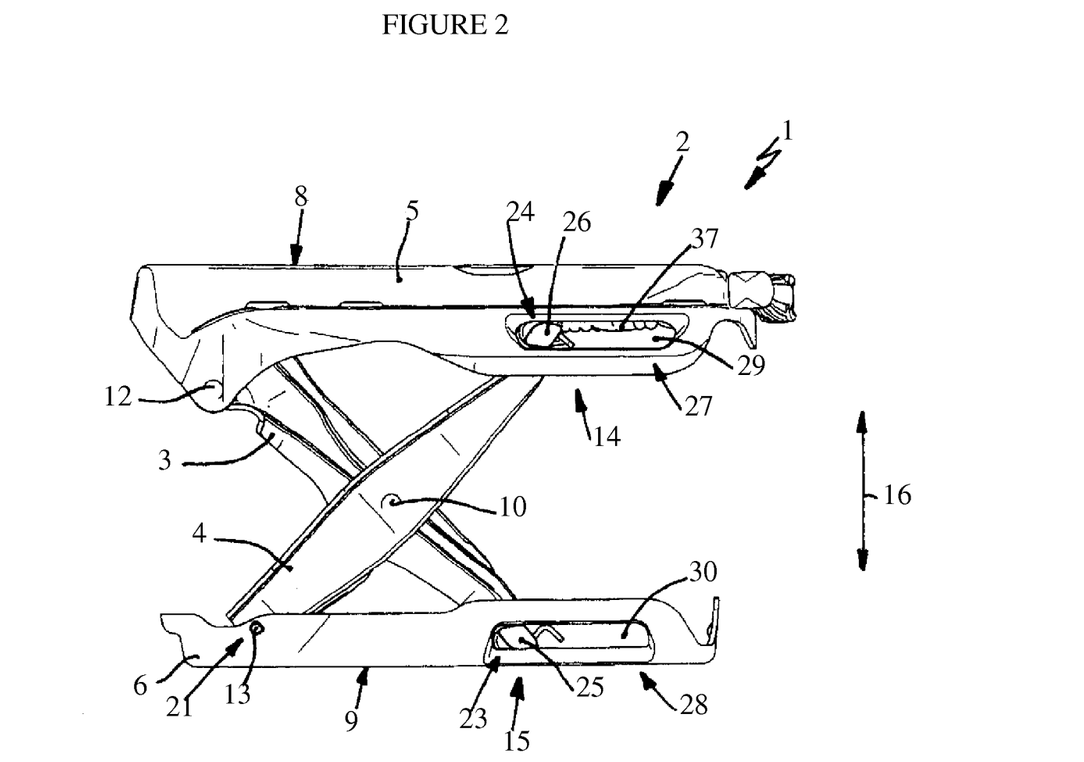
FIG. 2 schematically shows a side view of the scissors-type frame of FIG. 1.

The scissors-type frame 1 illustrated in FIGS. 1 and 2 forms a substructure 2 of a motor vehicle seat (not shown in any greater detail here) for a vehicle driver.

Figure 5:
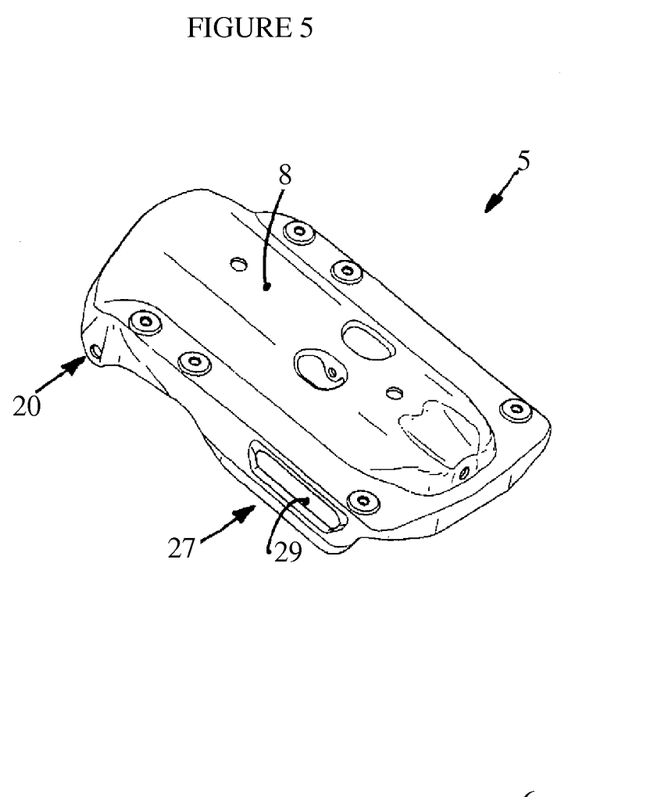
FIG. 5 schematically shows a view of an upper terminal element of FIGS. 1 and 2.
Figure 6:
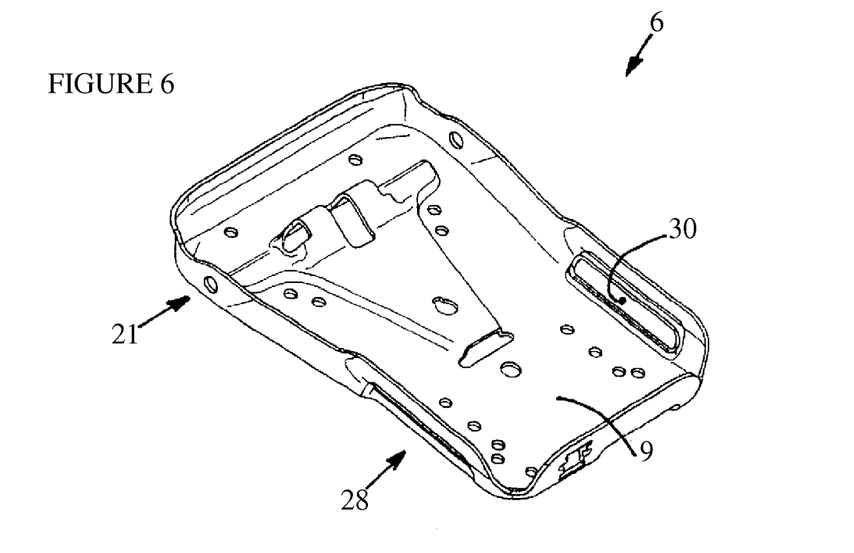
FIG. 6 schematically shows a view of a lower terminal element of FIGS. 1 and 2.

The scissors-type frame 1 consists essentially of a first scissors element 3 (see in particular FIG. 3), a second scissors element 4 (see in particular FIG. 4), an upper terminal element 5 (see in particular FIG. 5) and a lower terminal element 6 (see in particular FIG. 6).

Here, the two scissors elements 3 and 4 are designed and arranged relative to one another in such a way that the first scissors element 3 passes through the second scissors element 4, as a result of which the two scissors elements 3 and 4 can be accommodated within a very small space. The entire substructure 4 is therefore of very compact construction.

In order that the first scissors element 3 can pass through the second scissors element 4 without any problem, the second scissors element 4 has a suitable material cutout 7 which is peripherally closed and is delimited all the way round by the second scissors element 4. The second scissors element 4 thus encompasses the first scissors element 3 at least partially. Here, the material cutout 7 is punched into the second scissors element 4 in a simple manner in design terms.

Overall, the two scissors elements 3 and 4 can be produced particularly easily since they are in each case formed from a semi-finished product, such as a metal sheet. Each of the scissors elements 3, 4 is therefore produced as a one-piece punched sheet metal part, resulting in a high strength. Moreover, this also applies to the two terminal elements 5 and 6, since these are likewise formed from a metal sheet, wherein the upper terminal element 5 provides a seat plate 8, at which the actual seat can be attached to the scissors-type frame 1. The lower terminal element 6 forms a base plate 9 of the scissors-type frame 1, via which the scissors-type frame 1 can be attached to a vehicle body (not shown here). The scissors elements 3, 4 and the terminal elements 5, 6 can therefore be produced in a manner free from weld seams and thus advantageously also without warping.

The two scissors elements 3, 4 moreover have a common bearing axle 10, wherein the common bearing axle 10 in this example of embodiment is designed as a simple push-in axle 11. By means of the common push-in axle 11, the two scissors elements 3 and 4 are non-detachably connected to one another as a compact unit and cannot easily be lifted off one another. In order to receive the common push-in axle 11, first push-in axle openings 11A (see FIG. 3) are provided on the first scissors element 3 and push-in axle openings 11B (see FIG. 4) are provided on the second scissors element 4, wherein all the push-in axle openings 11A and 11B are formed by the scissors elements 3 and 4 themselves.

Furthermore, the scissors elements 3 and 4 are mounted on the terminal elements 5 and 6 such that they can move in rotation by means of rotary bearings 12 and 13 and such that they can move in translation by means of sliding bearings 14 and 15. The two scissors elements 3 and 4 can thus execute a scissors-type movement between the two terminal elements 5 and 6, as a result of which inter alia the height 16 of the substructure 2 can be adjusted.

The rotary bearings 12 and 13 are in each case equipped with a rotary bearing axle 17 (referenced here only by way of example for the rotary bearing 12 in FIG. 1), so that the two scissors elements 3 and 4 can be rotatably attached to the terminal elements 5 and 6.

In order that the respective rotary bearing axle 17 can be mounted in a structurally very simple manner on the scissors elements 3 and 4, the scissors elements 3 and 4 in each case have corresponding bearing eyes 18 (see FIG. 3) or corresponding bearing eyes 19 (see FIG. 4) as bearing devices of the scissors elements 3 and 4. Further bearing eyes 20 and 21 (see FIGS. 5 and 6) which correspond thereto are formed on the respective terminal element 5 and 6, which in each case form bearing devices on the terminal elements 5 and 6.

All the bearing eyes 18 to 21 are formed either directly by the scissors elements 3 and 4 or by the terminal elements 5 and 6, in particular are suitably formed thereon by punching. As a result, advantageously no additional bearing components are required, which further simplifies the scissors-type frame 1.

Figures 7, 8, 9:
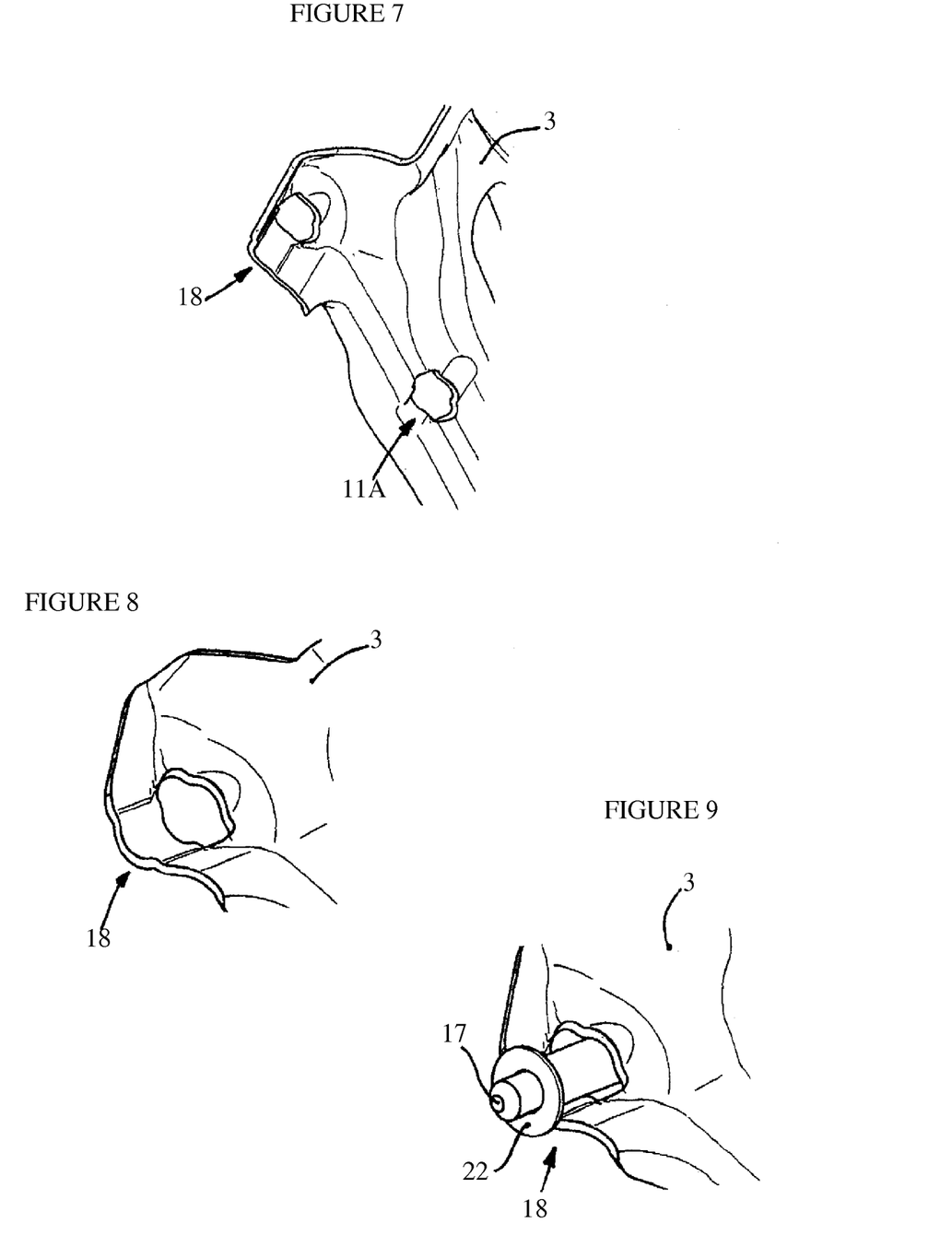
FIG. 7 schematically shows a bearing opening for a rotary bearing and a further bearing opening for a push-in axle on the first scissors element of FIG. 3.
FIG. 8 schematically shows a detail view of the bearing opening for the rotary bearing of FIG. 7.
FIG. 9 schematically shows a further detail view of the bearing opening with the inserted rotary axle of the rotary bearing of FIGS. 7 and 8.
Figure 10:
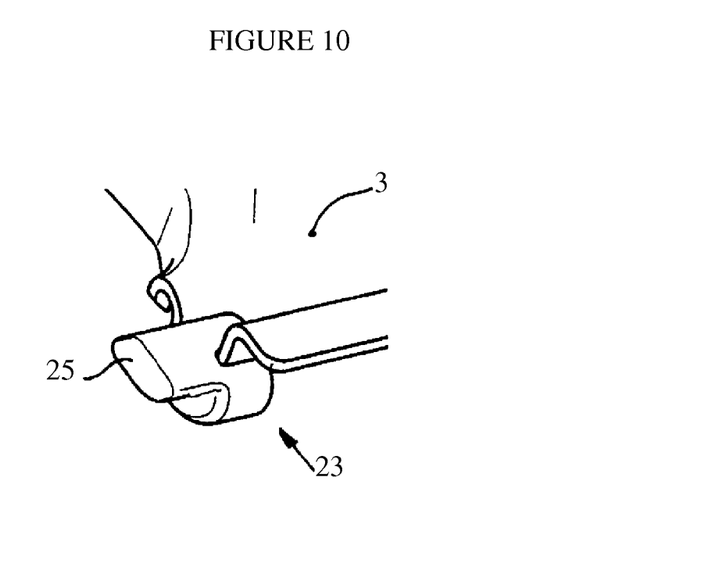
FIG. 10 schematically shows a view of a sliding element.
Figure 11:
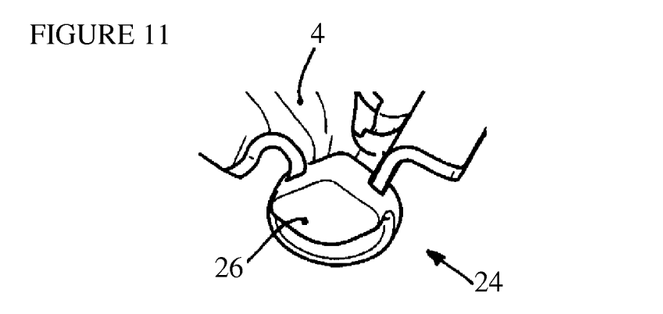
FIG. 11 schematically shows a view of a further sliding element.
Figure 12:
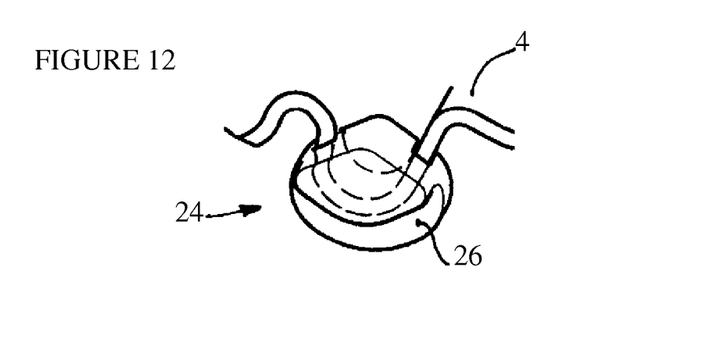
FIG. 12 schematically shows a further view of the further sliding element of FIG. 11.

One of the integrally formed bearing eyes 18 of the first scissors element 3, together with the rotary bearing axle 17 (see in particular FIG. 9), is clearly visible in particular in the detail views shown in FIGS. 7, 8 and 9. Arranged on the rotary bearing axle 17 is a spacer washer 22 which is placed between the first scissors element 3 and the upper terminal element 5 when the scissors-type frame 1 is correctly assembled, so that the first scissors element 3 and the upper terminal element 5 cannot bear directly against one another.

Figure 4:
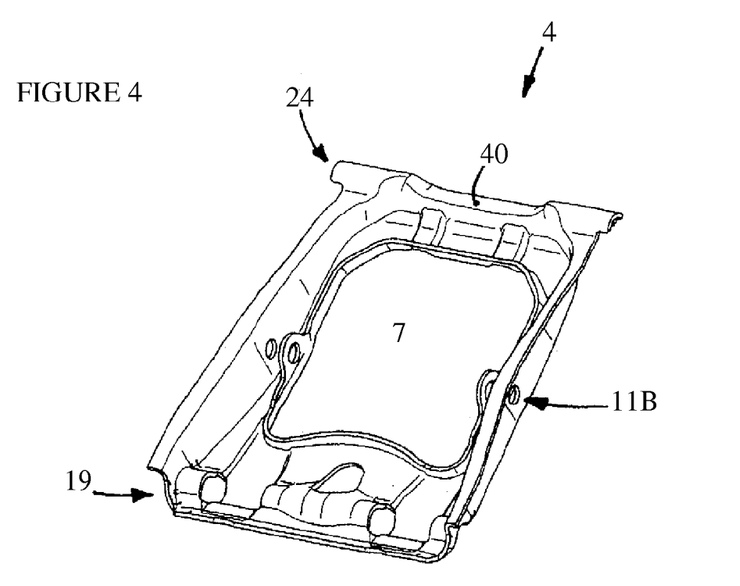
FIG. 4 schematically shows a view of a second scissors element of FIGS. 1 and 2.

The bearing eyes 18, 19, 20 and 21 are not restricted here just to locations at the edges of the scissors elements 3, 4 or of the terminal elements 5, 6, but rather they are also formed in the centre of the scissors elements 3, 4 and terminal elements 5, 6, as can clearly be seen in the diagrams shown in FIGS. 4 and 6.

Figure 3:
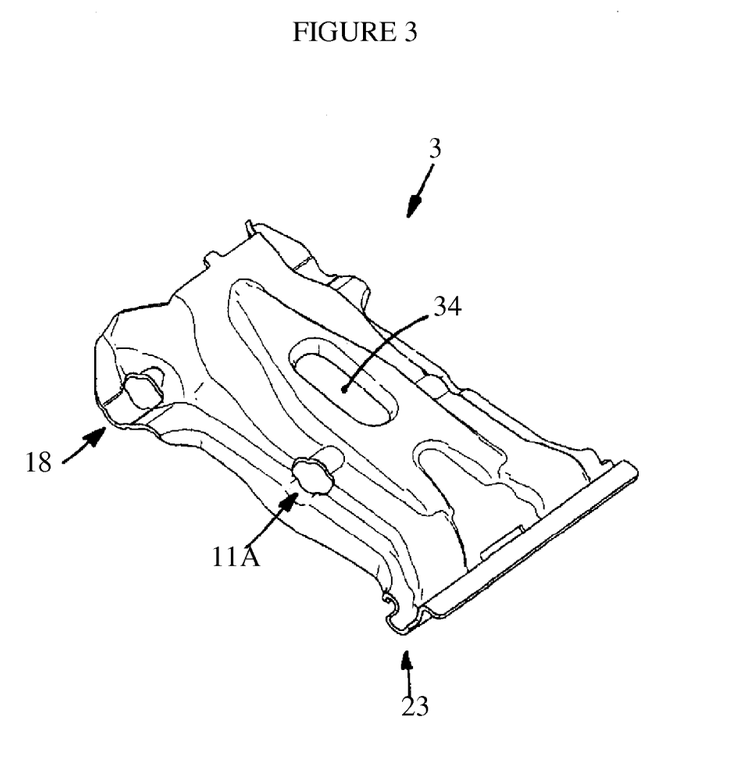
FIG. 3 schematically shows a view of a first scissors element of FIGS. 1 and 2.

Further bearing devices of the scissors elements 3 and 4 are formed as bearing pins 23 and 24 (see in particular FIGS. 3 and 4). The bearing pins 23, 24 are equipped here with sliding elements 25 and 26 preferably made from plastic, which engage in guide devices 27 and 28 of the respective terminal element 5 and 6 and are guided in translation therein. Advantageously, the guide devices 27 and 28 in each case consist of material cutouts 29 and 30, which are punched out of the upper and lower terminal elements 5, 6. As a result, the guide devices 27 and 28 are also formed by the terminal elements 5 and 6.

Figure 13:
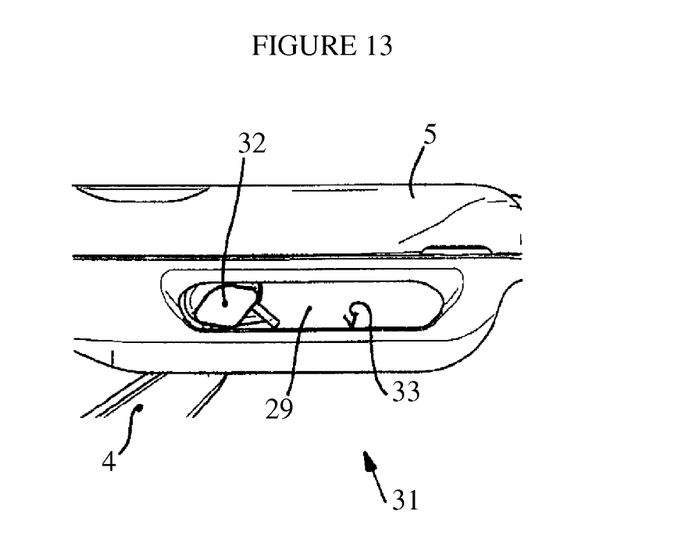
FIG. 13 schematically shows a view of a guide device of the upper terminal element of FIG. 5.
Figure 14:
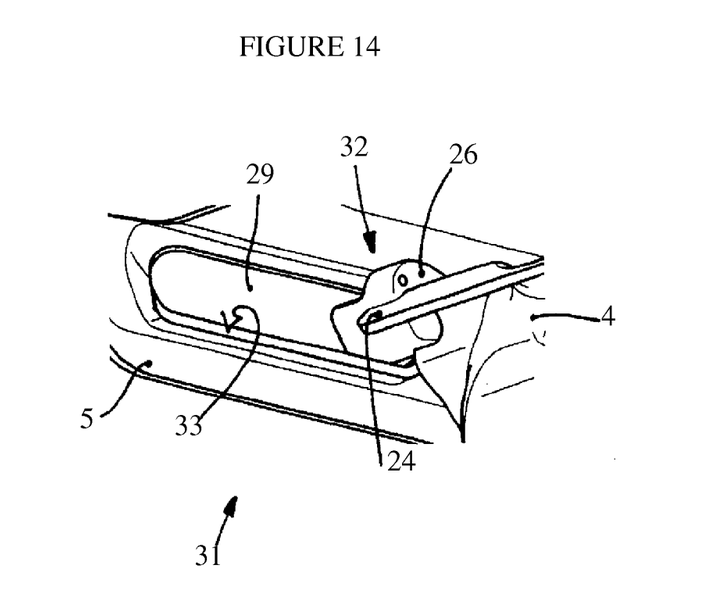
FIG. 14 schematically shows a detail view of the guide device of FIG. 13.

In the present case, in particular the bearing pins 23, 24 with their sliding elements 25, 26 in conjunction with the guide devices 27, 28 in each case form a connection device 31 (see FIGS. 13 and 14) for connecting one of the scissors elements 3 or 4 to one of the terminal elements 5 or 6, in which a first connection element 32, for example one of the bearing pins 23 or 24, is in each case formed by the scissors element 3 or 4 and a further connection element 33, for example one of the material cutouts 29 or 30, is formed by the terminal element 5 or 6. Here, then, the first connection element 32 in terms of one of the scissors elements 3 or 4 is guided directly in the other connection element 33 in terms of one of the terminal elements 5 or 6.

In the present case, advantageously all the bearing devices, such as bearing eyes 18 to 21 and bearing pins 23, 24, are formed directly by the scissors elements 3 and 4 and/or by the terminal elements 5 and 6.

The scissors-type frame 1 is also of particularly compact construction due to a through-opening 34 which is punched out of the first scissors element 3 for a damper 35 (shown in dash-dotted line only in FIG. 1) of a damper device 36 of the scissors-type frame 1, since as a result the entire damper device 36 can be integrated particularly well in the scissors-type frame 1. To this end, the damper 35 passes through at least the first scissors element 3. Advantageously, the damper 35 is mounted in a simple and compact manner with its lower end directly on the rotary bearing 13, while the damper 35 is attached by its upper end in a suitable manner to the upper terminal element 5.

Furthermore, the scissors-type frame 1 has a spring device 37 (see FIGS. 1, 15, 16 and 17) with two spring elements 38 and 39 which are attached on the one hand to the upper terminal element 5 and on the other hand to the second scissors element 4. Provided at least in the end region 40 of the second scissors element 4 is a spring support 41 which can be rolled off at the end region 40, as a result of which the two spring elements 38, 39 are attached to the second scissors element 4 in a secure but movable manner. As a result, the spring function of the scissors-type frame 1 can be significantly improved. Not only is the contact area increased, but also the friction is replaced by the tilting movement about the edge, which significantly reduces the load and wear on the bearing points.

Figure 15:
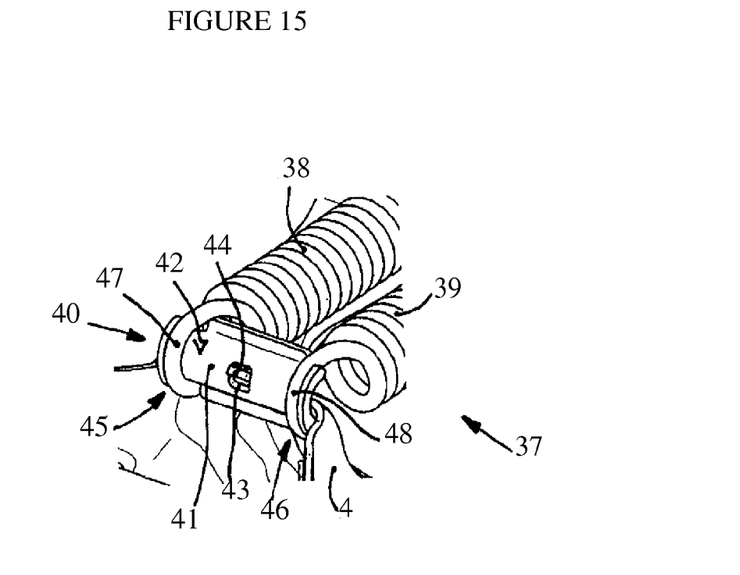
FIG. 15 schematically shows a perspective view of a spring support on the second scissors element of FIG. 4.
Figure 16:
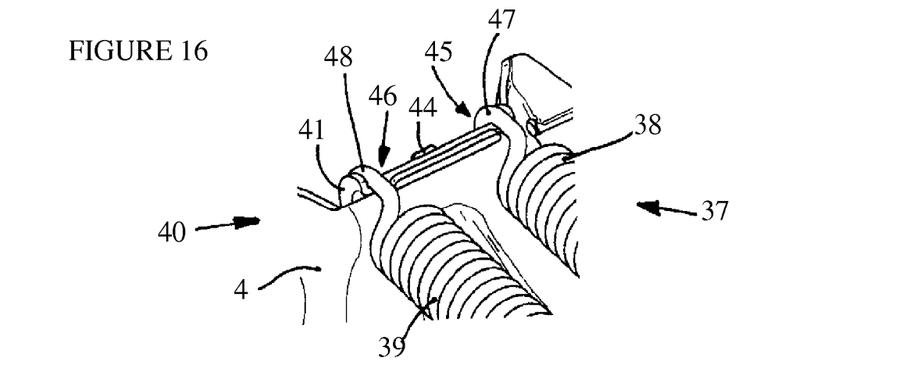
FIG. 16 schematically shows a further view of the spring support of FIG. 15.
Figure 17:
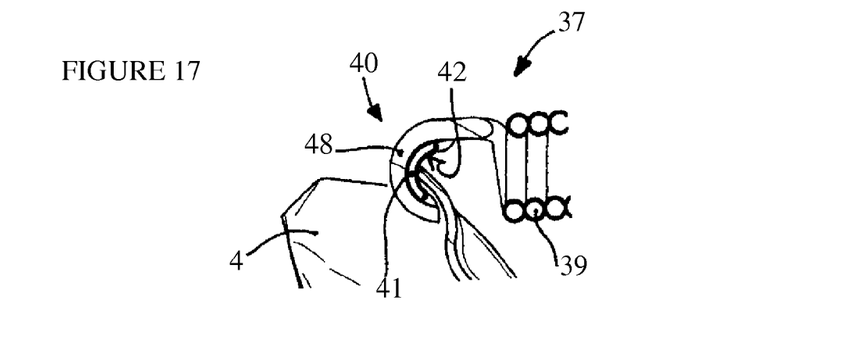
FIG. 17 schematically shows a sectional view of the spring support of FIGS. 15 and 16.

In this example of embodiment, the spring support 41 consists essentially of a longitudinal body 42 which is curved in a semi-circular manner and which is bent around the end region 40 of the second scissors element 4. As additional adjustment, the spring support 41 has a notch 43, into which a tab 44 of the second scissors element 4 engages. This prevents in particular a critical displacement and/or rotation of the spring support 41 relative to the end region 40 of the second pivoting element 4.

In order to reduce the risk of the spring elements 38, 39 inadvertently jumping off the spring support 41, the spring support 41 is furthermore equipped with two spring end holders 45 and 46, into which the bent spring ends 47 and 48 of the two spring elements 38 and 39 can hook in a particularly secure manner.

All of the features disclosed in the application documents are claimed as essential to the invention in so far as they are novel individually or in combination with respect to the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A scissors-type frame for a vehicle seat, comprising
   first and second scissors elements, wherein at least one of the first and second scissors elements passes through the other scissors element and the first and second scissors elements are configured to adjust the height of the scissors-type frame; and
   a spring support arranged in a roll-off manner at one end of at least one of the first or second scissors elements, wherein the spring support comprises a notch into which at least one of the first or second scissors elements protrudes with a tab.

2. The scissors-type frame according to claim 1, wherein the first scissors element is arranged within a peripherally closed material cutout of the second scissors element.

3. The scissors-type frame according to claim 1, wherein the first scissors element encompasses the second scissors element.

4. The scissors-type frame according to claim 1, wherein the first and second scissors elements are rotatably mounted about a common bearing axle.

5. The scissors-type frame according to claim 1, wherein at least one of the first and second scissors elements is made by forming from a semi-finished product.

6. The scissors-type frame according to claim 5, wherein the first and second scissors elements are made by forming from a semi-finished product.

7. The scissors-type frame according to claim 6, wherein the first and second scissors elements are formed by at least one of a one-piece punched sheet metal or by bending.

8. The scissors-type frame according to claim 1, wherein at least one of the first and second scissors elements is formed by at least one of a one-piece punched sheet metal or by bending.

9. The scissors-type frame according to claim 1, wherein at least one of the first and second scissors elements has a through-opening configured to receive a damper.

10. The scissor-type frame according to claim 1, wherein the second scissor element is arranged within the first scissor element and further comprising a damper configured to pass through at least one of the first and second scissors elements while the second scissor element is arranged within the first scissor element.

11. The scissor-type frame according to claim 1, further comprising a seat and a base, wherein:
   the seat is integrally mounted to the first scissors element in a rotational manner by means of a rotary bearing and the base is integrally mounted to the first scissors element in a translational manner by means of a sliding bearing; and
   the seat is integrally mounted to the second scissors element in a transitional manner by means of a sliding bearing and the base is integrally mounted to the second scissors element in a rotational manner by means of a rotary bearing.

12. The scissor-type frame according to claim 11, further comprising a damper mounted on at least one of the seat or the base rotary bearings.

13. The scissor-type frame according to claim 12, wherein the damper is mounted on the base rotary bearing.

14. The scissors-type frame according to claim 1, wherein at least one of the first or second scissor elements comprises at least one bearing eye, further comprising at least one bearing eye formed within at least one of a seat or a base integrally mounted to the at least one of the first or second scissor elements, wherein the bearing eyes are configured to move at least one of the first or second scissors elements with respect to at least one of the seat or the base.

15. The scissors-type frame according to claim 14, wherein the bearing eyes are formed in one piece with at least one of the first and second scissors elements or at least one of the seat or the base.

16. The scissors-type frame according to claim 1, wherein at least one of the first or second scissor elements comprises at least one bearing pin, wherein the at least one bearing pin is configured to allow at least one of the first or second scissor elements to move with respect to at least one of a seat or a base.

17. The scissors-type frame according to claim 16, wherein the at least one bearing pin is formed in one piece with at least one of the first or second scissors elements.

18. The scissor-type frame according to claim 16, wherein the bearing pin comprises a sliding element.

19. The scissor-type frame according to claim 18, wherein the sliding element is pushed onto the bearing pin.

20. The scissors-type frame according to claims 18, wherein the sliding element is made from plastic.

21. The scissors-type frame according to claim 16, wherein at least one of the seat or the base comprises a guide configured to receive the bearing pin.

22. The scissors-type frame according to claim 21, wherein the guide is a material cutout in the at least one of the seat or the base.

23. The scissor-type frame according to claim 1, further comprising:
   at least one bearing pin associated with at least one of the first or second scissor elements; and
   a seat and a base, wherein at least one of the seat or the base has a guide configured to receive the at least one bearing pin;
   wherein the at least one bearing pin is slidably mounted in the guide.

24. The scissors-type frame according to claim 1, further comprising:
   a first connector formed from at least one of the first or second scissors element; and
   a second connector formed from at least one of a seat or a base;
   wherein the second connector is configured to receive the first connector.

25. The scissor-type frame according to claim 24, wherein the first connector is guided within the second connector.

26. The scissor-type frame according to claim 1, further comprising:
   a spring assembly having at least one spring; and
   at least one of a seat or a base;
   wherein the at least one spring is arranged between at least one of the first or second scissors elements and at least one of the seat or the base.

27. The scissor-type frame according to claim 1, wherein the spring support comprises a bent base body that is bent about one of its longitudinal axes.

28. The scissors-type frame according to claim 1, wherein the spring support comprises at least one spring end holder configured to connect the spring support to a spring end of the at least one of the first and second spring elements.

29. A substructure for a motor vehicle seat, comprising:
   a scissors-type frame having first and second scissors elements, wherein the first scissors element passes through the second scissors element and the first and second scissors elements are configured to adjust the height of the scissors-type frame;
   a seat;
   a base; and
   a spring support arranged in a roll-off manner at one end of at least one of the first or second scissors elements, wherein the spring support comprises a notch into which at least one of the first or second scissors elements protrudes with a tab,
   wherein at least one of the first and second scissors elements is mounted to the seat in a rotational manner by means of a rotary bearing and mounted to the base in a translational manner by means of a sliding bearing and at least one of the first and second scissors elements is mounted to the base in a rotational manner by means of a rotary bearing and mounted to the seat in a translational manner by means of a sliding bearing.

30. The substructure for a motor vehicle seat according to claim 29, further comprising a damper mounted on at least one of the seat or the base rotary bearings.

* * * * *